United States Patent
Capet et al.

(10) Patent No.: US 10,656,283 B2
(45) Date of Patent: May 19, 2020

(54) ADAPTATIVE ANTENNA ASSEMBLY FOR IMPROVING PRECISION OF A GNSS RECEIVER IN A PERTURBATED ENVIRONMENT

(71) Applicant: CENTRE NATIONAL D'ETUDES SPATIALES, Paris (FR)

(72) Inventors: Nicolas Capet, Toulouse (FR); François-Xavier Marmet, Muret (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 325 days.

(21) Appl. No.: 15/596,676

(22) Filed: May 16, 2017

(65) Prior Publication Data
US 2017/0343677 A1    Nov. 30, 2017

(30) Foreign Application Priority Data
May 27, 2016   (EP) ..................................... 16305611

(51) Int. Cl.
| | |
|---|---|
| *G01S 19/22* | (2010.01) |
| *G01S 19/26* | (2010.01) |
| *G01S 19/36* | (2010.01) |
| *H01Q 3/36* | (2006.01) |
| *G01S 17/86* | (2020.01) |
| *G01S 13/86* | (2006.01) |
| *H04N 5/232* | (2006.01) |
| *H04N 5/33* | (2006.01) |

(52) U.S. Cl.
CPC .............. *G01S 19/22* (2013.01); *G01S 19/26* (2013.01); *G01S 19/36* (2013.01); *H01Q 3/36* (2013.01); *G01S 13/86* (2013.01); *G01S 17/86* (2020.01); *H04N 5/23238* (2013.01); *H04N 5/33* (2013.01)

(58) Field of Classification Search
None
See application file for complete search history.

(56) References Cited

U.S. PATENT DOCUMENTS

2017/0117628 A1* 4/2017 Banasky .............. H01Q 1/3233

FOREIGN PATENT DOCUMENTS

| FR | 2906632 A1 | 4/2008 |
|---|---|---|
| WO | 20060113689 A2 | 10/2006 |

OTHER PUBLICATIONS

European Search Report for 16305611.2 dated Nov. 18, 2016.
(Continued)

*Primary Examiner* — Whitney Moore
(74) *Attorney, Agent, or Firm* — Meagher Emanuel Laks Goldberg & Liao, LLP

(57) ABSTRACT

The invention discloses an antenna assembly comprising one or more sensors, possibly a fish-eye camera which produces images of the sky above the antenna, said images being processed to identify open sky and occulted sky areas, said identification being used to generate an antenna gain pattern shape wherein null zones are placed on the occulted sky areas, so as to eliminate the GNSS signals which are affected by multipath reflection. The antenna assembly of the invention may be used with any GNSS receiver of the prior art. No specific data on the location of the receiver or its orientation is needed to perform the method of the invention, while in some embodiments, it may be useful to send some information on the number of satellites in view in the open sky.

16 Claims, 14 Drawing Sheets

(56) References Cited

OTHER PUBLICATIONS

J-I Meguro et al: "GPS Multipath Mitigation for Urban Area Using Omnidirectional Infrared Camera", IEEE Transactions on Intelligent Transportation Systems, IEEE, Piscataway, NJ, USA, vol. 10, No. 1, Mar. 1, 2009 (Mar. 1, 2009), pp. 22-30.
Bhuiyan et al.: "Advanced Multipath Mitigation Techniques for Satellite-Based Positioning Applications", International Journal of Navigation and Observation, Article ID 412393, vol. 2010.
Neuenschwander, "Satellite Tracking from Camera: The Inverse GPS Problem", Swiss Federal Institute of Technology, Zurich, 2009.
P.V. Gakne and al.: "Assessing Image Segmentation Algorithms for Sky Identification in GNSS", International Conference on Indoor Positioning and Indoor Navigation, Banff, Alberta, Canada, Oct. 2015.

* cited by examiner

| Possible phase shifter configurations | Element 1 | 2 | 3 | 4 |
| --- | --- | --- | --- | --- |
| 1 | 0° | 0° | 0° | 0° |
| 2 | 180° | 0° | 0° | 0° |
| 3 | 0° | 180° | 0° | 0° |
| 4 | 0° | 0° | 180° | 0° |
| 5 | 0° | 0° | 0° | 180° |
| 6 | 180° | 180° | 0° | 0° |
| 7 | 180° | 0° | 180° | 0° |
| 8 | 180° | 0° | 0° | 180° |
| 9 | 0° | 180° | 180° | 0° |
| 10 | 0° | 180° | 0° | 180° |
| 11 | 0° | 0° | 180° | 180° |
| 12 | 180° | 180° | 0° | 180° |
| 13 | 180° | 0° | 180° | 180° |
| 14 | 0° | 180° | 180° | 180° |
| 15 | 180° | 180° | 180° | 0° |
| 16 | 180° | 180° | 180° | 180° |

FIG.7

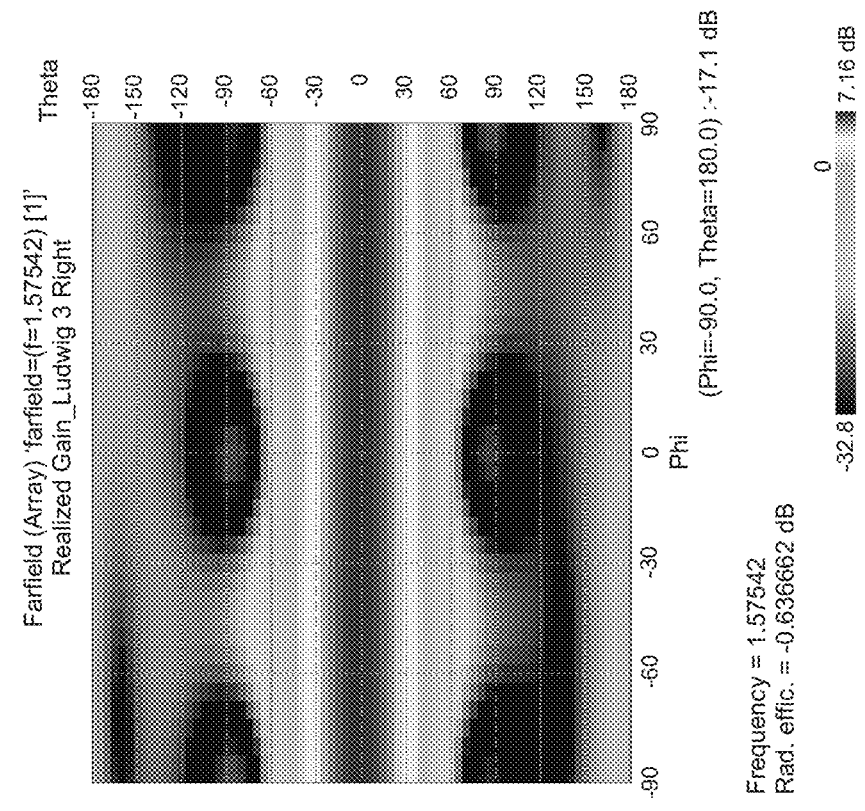
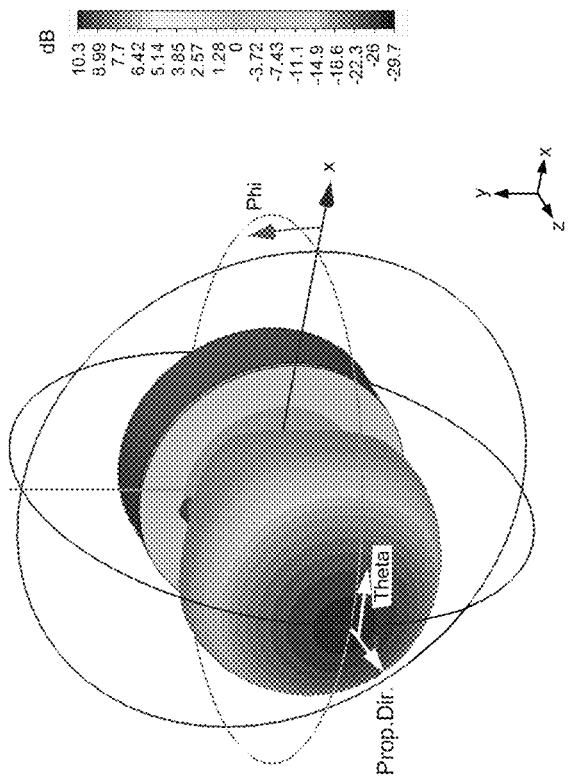
Configurations 1 and 16
Diagramme I
FIG. 8a

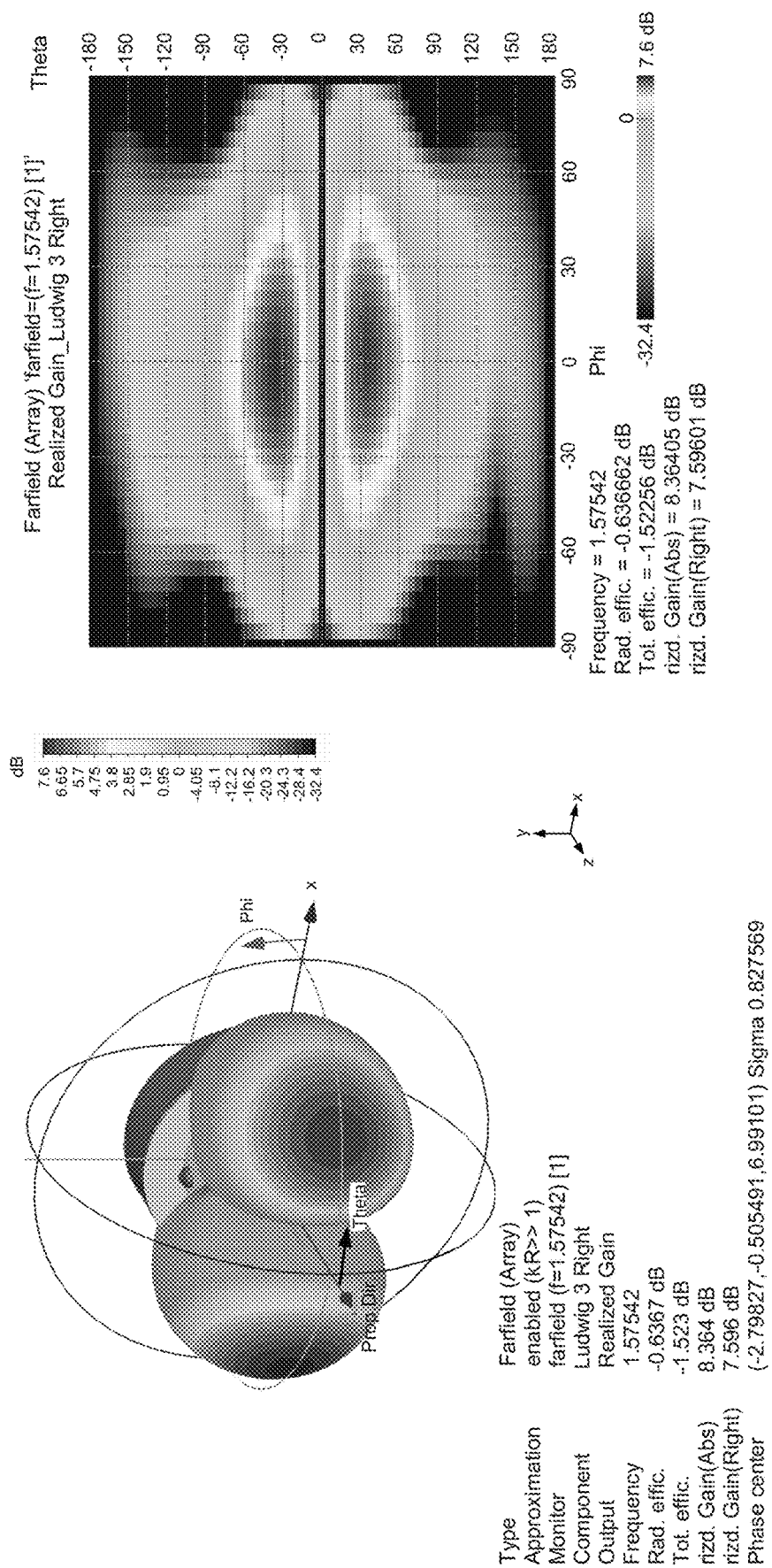

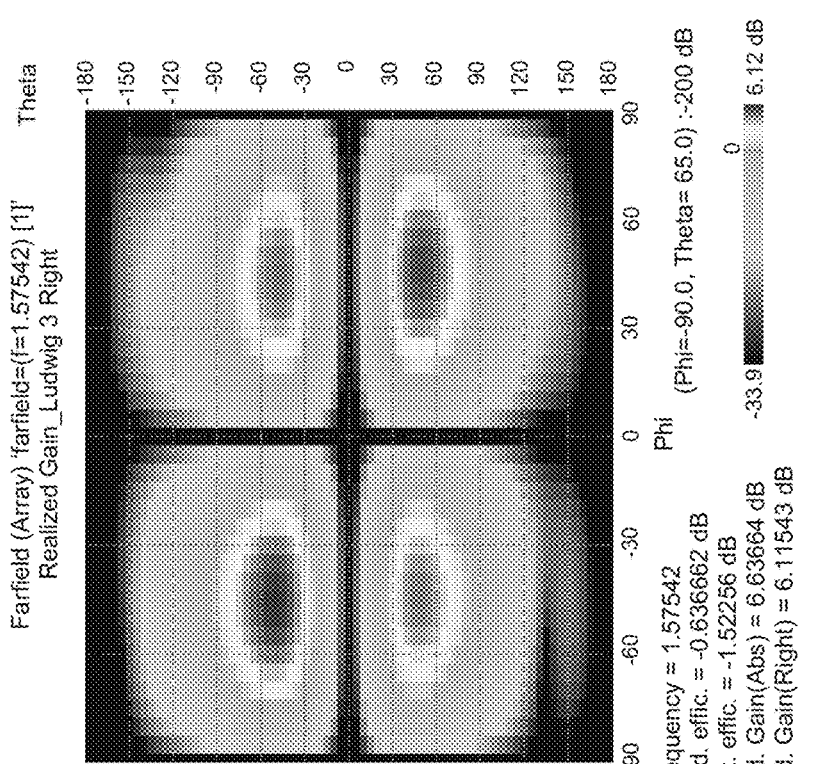
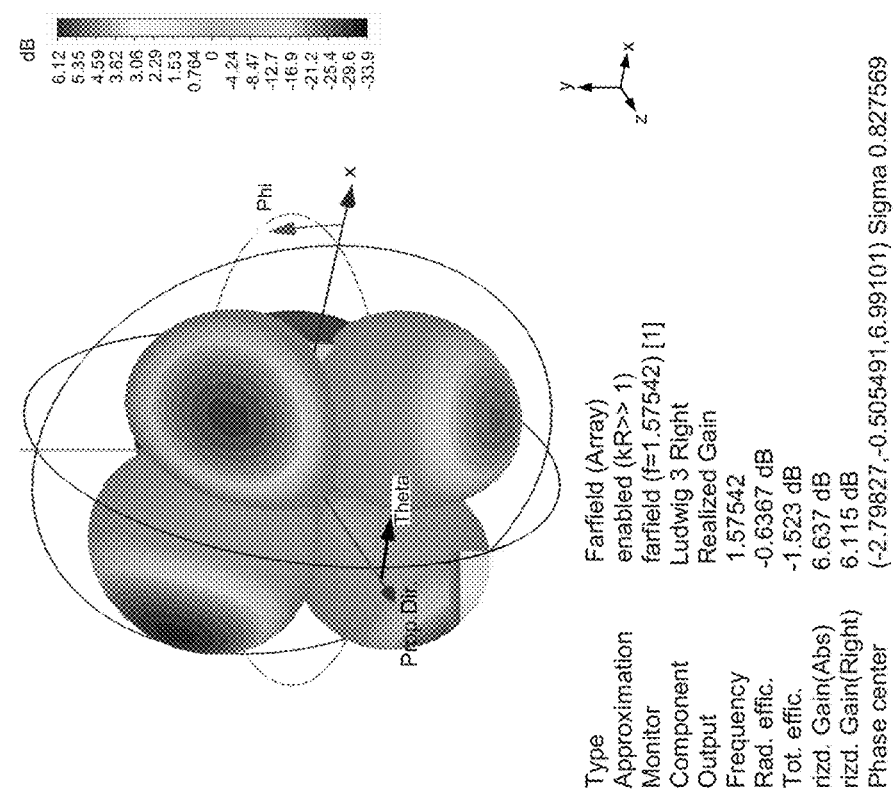
Configurations 8 and 9
Diagramme VI
FIG. 8f

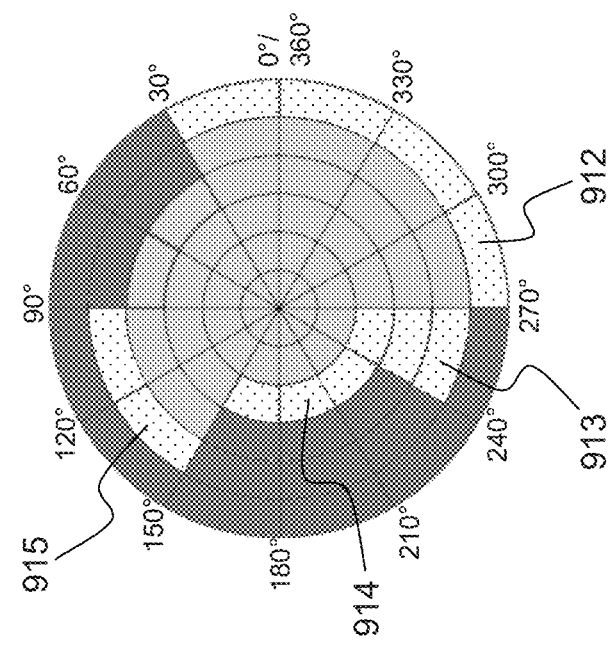
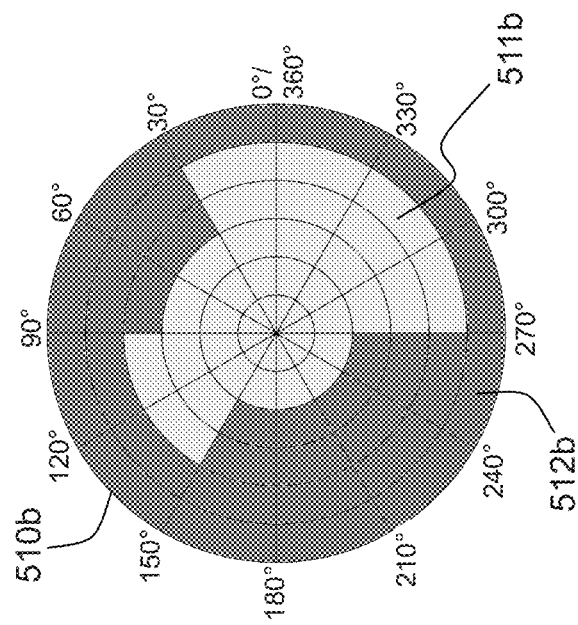
FIG.9

ADAPTATIVE ANTENNA ASSEMBLY FOR IMPROVING PRECISION OF A GNSS RECEIVER IN A PERTURBATED ENVIRONMENT

FIELD OF THE INVENTION

The invention relates to an antenna assembly for a GNSS receiver. More specifically the radiation pattern of the antenna in the antenna assembly may be adapted or reconfigured to provide a higher proportion of Line Of Sight (LOS) signals to a standard GNSS receiver which will then be better protected against non-LOS signals which can degrade the overall precision of the navigation system.

BACKGROUND

The use of navigation receivers becomes increasingly pervasive in everyday life. It is all the more common that cars' on-board electronics, smart phones, tablets include navigation receivers, and that applications running thereon capture as input information on position and trajectory of the user of the terminal.

Navigation receivers rely on L-Band RF (radio frequency) signals transmitted by Medium Earth Orbiting satellites, which are generally included in constellations comprising tens of them to cover most of the surface of the earth, such as the GPS™ (US), Galileo™ (Europe), Glonass™ (Russia) and Beidou™ (China). These constellations are designated under the generic acronym of GNSS (Global Navigation Satellite System).

GNSS carrier signals are modulated by a pseudo-random code and a navigation message which allow calculation of a pseudo-range between the receiver and a definite satellite. With a minimum of four pseudo-ranges, it is possible to calculate Position, Velocity and Time (PVT) of the receiver. In receivers of the type which are used by consumers, the position information is the one which is directly used to compute the navigation solution.

PVT measurements are affected by a number of errors, some of which are intrinsic to the principle of measurement used (i.e, due to the deviation in trajectory of the RF signals through the atmosphere—ionosphere and troposphere—due to variations in the orbits of the satellites), intrinsic to the receiver and satellites imperfections (clock biases for instance), or intrinsic to some configurations of the satellites in view at a moment in time (i.e. elevation of the satellites over the horizon; low dispersion of visible satellites—high Dilution Of Precision or DOP). A number of corrections can be used to mitigate these errors, either with the use of specific processing techniques which are only available to certain types of receivers (i.e. bi-frequency receivers can mitigate ionospheric errors up to a gain of precision from a few tens of meters to a few meters or better, depending on the quality of the corrections°. This is known as Precise Point Positioning or PPP. Differential GPS (DGPS) or Real Time Kinematics (RTK) provide a precision of a few tens of centimetres thanks to an integration of outside information (relative positioning vis-à-vis a number of fixed reference stations with known positions).

It is more difficult to mitigate in a consistent and efficient manner some errors which depend on the position of the receiver, notably when this position is environed by a number of objects which reflect the navigation RF signals and/or mask a number of the satellites which should be in line of sight (LOS) at a moment in time. In such conditions, the precision of the calculation of the PVT may be quite poor, all other causes of errors being equal, both at the time of acquiring a GNSS signal and at the time of tracking said signal.

In urban canyons (i.e. streets in between skyscrapers), multipath will not only increase the error in the determination of the pseudo-range of a satellite (User Equivalent Range Error or UERE), but also the (Geometric) Dilution Of Precision, (GDOP or DOP), because the field of view of the antenna will be narrower thus limiting the increase in precision due to the use of additional satellites.

The degradation in UERE is due to the signal impairments of the definite satellite which is acquired or tracked by a tracking loop. Tracking of a satellite relies on a maximization of a correlation function between the acquired code signal and a number of local replicas generated by the receiver of the code signals which are specific to each satellite. The correlation functions will be corrupted by multipath and the satellite may be not correctly acquired or may be lost. Even if signal tracking is still achievable, signal impairments will affect the correlation function's shape, thus degrading the pseudo-range estimation, and the UERE.

Most of the mitigation techniques therefore rely on specific processing applied at the correlation stage. For a general overview of these prior art techniques which can be applied, see for instance Bhuiyan et alii, Advanced Multipath Mitigation Techniques for Satellite-Based Positioning Applications, International Journal of Navigation and Observation, Volume 2010, Article ID 412393. Among these techniques are: using narrow correlators (i.e. correlators spaced by much less than a chip—or code length); using numerous correlators per tracking channel instead of a standard number of three and performing a double delta calculation; Multipath Estimation Delay Lock Loop, which uses the output of the correlation functions to estimate a full navigation signal of a definite satellite comprising LOS and non LOS signals.

All these solutions are complex and costly to implement either at the hardware level or at the software level. In any case, they cannot be currently implemented in a standard consumer receiver of the type used in a smart phone or a car navigation system.

Other attempts at mitigating multipath have been tried, for instance solutions of the type described by Neuenschwander, "Satellite Tracking from Camera: The Inverse GPS Problem", Swiss Federal Institute of Technology, Zurich, 2009. In approaches of this kind, images of the environment of the receiver are acquired; the images are converted into Earth Centered Earth Fixed coordinates using the output of an Inertial Navigation System (INS) which is fixed in relation to the GNSS receiver, and the satellites in LOS are deducted from a comparison between the output of the image processing and the satellites ephemerides which give positions of the satellites of a constellation as a function of time at a position.

Solutions of this kind are quite complex to implement because they require an INS platform and external data and necessitate significant processing power.

It is therefore important to find a solution to mitigate the effects of multipath which could be implemented in a standard receiver available to the general public.

The present invention discloses a solution to overcome the previously cited drawbacks.

SUMMARY OF THE INVENTION

A purpose of the present invention is to meet this need. To this effect, the invention discloses notably an antenna assembly the radiation pattern of which may be reconfigured based on a determination of the LOS field of view above the receiver which is determined by a sensor.

To this effect, this invention discloses an antenna assembly for receiving GNSS signals, the antenna assembly comprising: a plurality of RF antenna elements adapted to receive the GNSS signals; driving circuits adapted to drive the antenna elements to generate a defined radiation pattern; a sensor configured to capture data representative of one or more characteristics of portions of a volume in a field of view above the antenna assembly; an RF port to one or more GNSS receivers; computing logic configured to output a first projection of the portions of the volume on a first surface and a second projection of the defined radiation pattern on a second surface referenced to the first surface, said first projection classified into a discrete number of classes based on said data; processing logic configured to generate command signals of the driving circuits to shape the defined radiation pattern based on the classified first projection and send the GNSS signals to the one or more GNSS receivers through the RF ports.

Advantageously, one of the classes defines a LOS field of view for the antenna assembly and the driving circuits define a maximum gain in the radiation pattern for the class defining a LOS field of view.

Advantageously, the driving circuits are phase shifters.

Advantageously, the portions of the volume are solid angles defining a value of a gain of the antenna assembly.

Advantageously, the one or more characteristics of the portions of the volume comprise their transparency to electromagnetic radiations.

Advantageously, the data representative of the transparency of the portions of the volume to electromagnetic radiations comprise a two-state variable defining a LOS/non-LOS to an open sky above the surface.

Advantageously, the sensor comprises one or more of a fish-eye camera, a thermal camera, a radar or a lidar.

Advantageously, the classification is performed by the computing logic processing one or more of images and parameters in an output of a fish-eye camera to discriminate buildings and objects from the open sky.

Advantageously, the classification is performed by the computing logic processing one or more parameters in an output of a thermal camera to discriminate heat radiating objects.

Advantageously, the classification is performed by the computing logic processing one or more parameters in an output of a radar or a lidar to discriminate echo-returning objects in the field of view.

Advantageously, one or more of the computing logic or the processing logic access a table of gain pattern shaping factors stored in a memory of the antenna assembly, said gain pattern shaping factors to be applied to each class of the first projection, the gain pattern shaping factors being used to drive the driving circuits.

Advantageously, one or more of the computing logic or the processing logic are controlled by a minimum solid angle and extend the class defining the LOS field of view if the field of view of the class is lower than the minimum solid angle.

Advantageously, the antenna assembly of the invention further comprises a return path from the one or more GNSS receivers, said return path configured to acquire PVTs calculated by the one or more GNSS receivers.

Advantageously, one or more of the computing logic or the processing logic are controlled by a table of probabilities of finding a minimum of four GNSS satellites in fields of view at defined times and positions and the one or more of the computing logic or the processing logic are configured to extend the class defining the LOS field of view if the probability of finding a minimum of four GNSS satellites in the LOS field of view is lower than the minimum probability in the table at a position of the antenna assembly at the time of measurement.

The invention also discloses a positioning system comprising one or more GNSS receivers, said one or more GNSS receivers acquiring GNSS signals through an RF input receiving the GNSS signals from an antenna assembly, said antenna assembly comprising: RF antenna elements adapted to receive the GNSS signals; driving circuits adapted to drive the antenna elements to generate a defined radiation pattern; a sensor configured to capture data representative of one or more characteristics of portions of a volume in a field of view of the antenna assembly; an RF circuit connected to one or more GNSS receivers; computing logic configured to output a first projection of the portions of the volume on a first surface and a second projection of the defined radiation pattern on a second surface referenced to the first surface, said first projection classified into a discrete number of classes based on said data; processing logic configured to generate command signals of the driving circuits to shape the defined radiation pattern of the antenna assembly based on the classified first projection and send the GNSS signals to the one or more GNSS receivers.

The invention also discloses a method of shaping a radiation pattern of an antenna assembly for GNSS signals, the method comprising: receiving GNSS signals via the antenna assembly, said antenna assembly comprising RF antenna elements; driving the antenna elements to generate a defined radiation pattern; capturing data representative of one or more characteristics of portions of a volume in a field of view above the antenna assembly; outputting from an RF output the GNSS signals to one or more GNSS receivers; outputting a first projection of the portions of the volume on a first surface and a second projection of the defined radiation pattern on a second surface referenced to the first surface, said first projection classified into a discrete number of classes based on said data; generating command signals of the driving circuits to shape the defined radiation pattern of the antenna assembly based on the classified projection and send the GNSS signals to the one or more GNSS receivers through the RF output.

The invention is easy to implement on any GNSS receiver. It is not even necessary to modify the receivers. The antenna assembly of the invention may be coupled with any receiver and does not necessitate any retrofit of the receiver. The antenna assembly may use known methods of radiation pattern shaping, the shape to be generated being acquired from a pre-established abacus, with a selection of the points in the abacus based upon a determination of the free space above the receiver by processing of the output of sensors. The invention can work for high-end, mid-point, or consumer applications (i.e. helicopters, professional drones, navy ships; trucks or buses; car navigation systems; tablets and possibly smart phones).

Depending upon the class of application and a cost/benefit ratio which is consistent with the market for this application, a target precision may be advantageously defined, and this will define a specification of the antenna assembly, i.e. the size and number of the antenna elements, the performance of the antenna processing and memory units. Thanks to its versatility, the invention may thus be advantageously implemented across a wide range of applications. Basically, the invention can be implemented with a standard, unmodified, receiver. But it may also be implemented with a feed-back loop from the PVT calculation to select at a given time and location the best available measurement. The invention brings clear position accuracy improvements, both in severe and benign environments. For doing so, it does not need external data, such as augmentation data, real time kinematics or information on the topology of the environment of the receiver.

Also the invention provides protection against spoofing and jamming because on the ground spoofers and jammers are generally located at a low elevation.

In addition, the invention may be implemented with a low Size, Weight and Power device.

BRIEF DESCRIPTION OF THE DRAWINGS

The invention and its advantages will be better understood upon reading the following detailed description of a particular embodiment, given purely by way of non-limiting example, this description being made with reference to the accompanying drawings in which:

FIG. 7 displays a table of possible configurations of the antenna assembly of FIG. 6;

FIGS. 8a, 8b, 8c, 8d, 8e and 8f represent the radiation patterns of the antenna assembly of FIG. 6 in the different configurations displayed on the table of FIG. 7;

FIG. 9 illustrates a feed-back loop to adapt antenna gain pattern shaping in some embodiments of the invention.

DETAILED DESCRIPTION

Figure 1B:
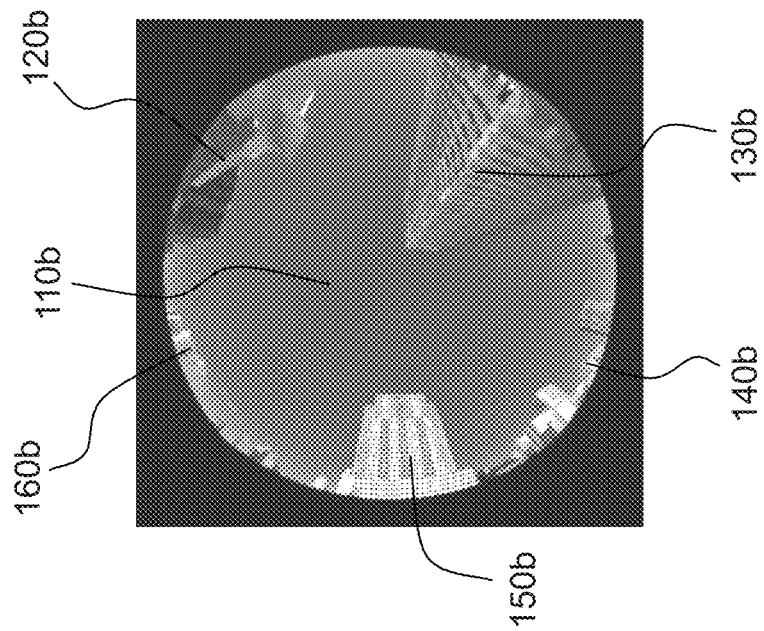
FIGS. 1a and 1b illustrate the problem of LOS/non-LOS communication in the prior art which is addressed by the invention.
Figure 1A:
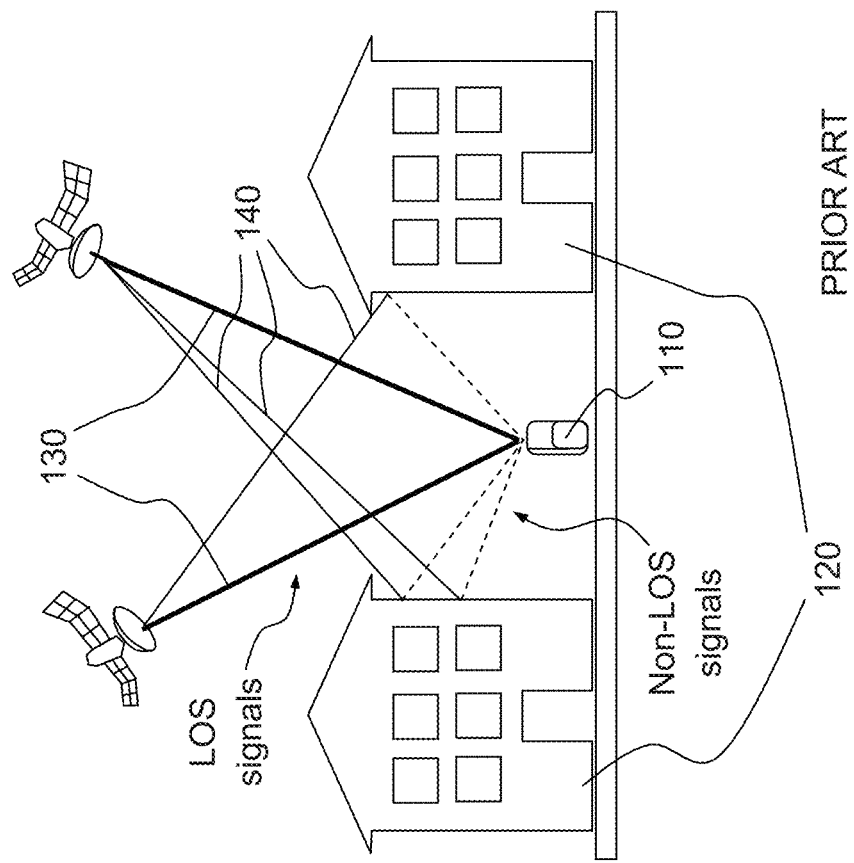

FIGS. 1a and 1b illustrate the problem of LOS/non-LOS communication in the prior art which is addressed by the invention.

On FIG. 1a, a receiver 110a is positioned between two buildings 120a. Certain signals 130a reach the receiver in a direct line. Other signals 140a reach the receiver after having been reflected from the buildings. A standard receiver is not able to make a difference between direct signals 130a and reflected signals 140a, thereby leading to a positioning error. Multipath errors at a given location of the receiver 110a will depend on the characteristics of the obstacles at the location (height, roughness of their surface, etc. . . . ) but also on the elevation of the satellites in view, and therefore on the time of the day, and on the meteorological conditions.

It is quite difficult to correct multipath errors, notably because they are location and time dependent and therefore require significant memory and/or processing power. Also, receivers which are configured or aided to cope easily with other types of errors, notably ionospheric errors, like bi-frequency receivers, are not efficient in a multipath environment, notably when a cold start is needed.

It has thus always been a problem to find a solution to this problem, as to other types of impairments which impact the error budget of a navigation solution. And even more so in a simple way which can be applied with standard GNSS receivers.

As can be seen on FIG. 1b, looking vertically above a GNSS receiver, the sky may be split into open view areas 110b of LOS visibility and reflection areas 120b, 130b, 140b, 150b, 160b, of non-LOS visibility. GNSS signals which come from area 110b can be processed without multipath mitigation, whereas signals coming from the other areas will comprise both direct RF signals and reflected signals, which will necessitate complex processing which will not be always efficient.

The idea of the invention is therefore to eliminate the signals received from satellites which are not in LOS, this result being obtained by shaping the radiation pattern of the antenna of the GNSS receiver to match the LOS/non-LOS segmentation of the sky above the receiver.

Figure 2:
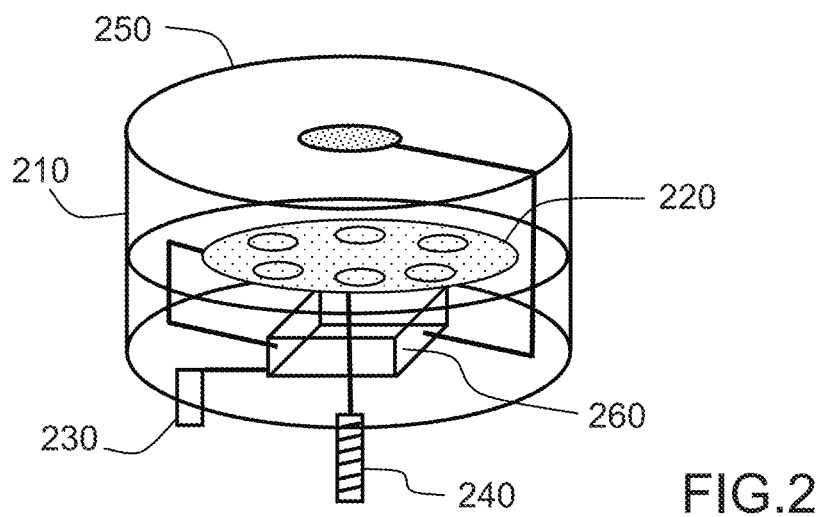
FIG. 2 displays a schematic view of an antenna assembly according to some embodiments of the invention.

FIG. 2 displays a schematic view of an antenna assembly according to some embodiments of the invention.

The antenna arrangement of FIG. 2 is a stylized view of an assembly which can have several form factors and can be located at different places in relation to the GNSS receiver. It comprises a radome 210 to protect the antenna elements 220 from rain or snow.

The antenna elements are shaped to receive GNSS signals in the L-Band (i.e. around 1.5 GHz for the current standard services available to the general public). They are also arranged so as to generate a variable radiation pattern, as will be explained further down in the description. For doing so, a number of parasitic elements, phase shifters and/or driving circuits may be located close to the antenna elements.

The radome also advantageously includes a DC input 230, an RF output 240 to transmit the signals to the GNSS receiver. In some embodiments, a data link (not shown on the figure) with the receiver may also be provided.

According to the invention, it also comprises either under an open portion of the top part of the radome or just above said top part, one or more sensors 250, which are configured to screen the sky above the antenna arrangement to determine a zoning of said sky. The sensors may not be collocated with the antenna arrangement, provided however that their relative position is known.

A sensor adequate to screen the sky may be a camera with a fish-eye lens. A fish-eye camera offers a wide field of view (FOV), i.e. of 180° in at least one direction. A fish-eye camera may be circular, i.e. producing a circular image which will not cover an entire frame of the image format, or full-frame, i.e. producing an image which will cover an entire frame of the image format and will be inscribed in a circle larger than the frame. As an alternative, a number of CCD/CMOS image sensors with different elevation and azimuth orientations arranged on a hemispheric radome may offer the same combined FOV. In an embodiment, each of such image sensors may be connected to an individual antenna element to drive the gain of the same based on an amount of light received within the FOV of said individual couple of image sensor and antenna element. Such an embodiment is described in relation to FIGS. 2a and 2b herein below.

The image sensors may be sensitive to visible light only but also to ultraviolet (UV) or infrared (IR) light. A combination of visible light and IR sensors may be necessary for the receiver to be able to operate at night.

In some embodiments, the image sensors may be replaced by a plurality of radar, LIDAR or thermal sensors. These types of sensors will also allow a differentiation of open sky and occulted sky based on detection of an obstacle in the FOV of the sensor.

In other embodiments, the one or more sensors may comprise a combination of image sensors and radar, LIDAR or thermal sensors. Such configuration may be useful to provide night/day capability and also when the GNSS receiver receives signals with "clean" multipath reflections, i.e. reflections which may be usefully exploited. For instance, in a use case where the multipath reflection is specular, i.e. if the surface reacts as a mirror to electromagnetic radiations, it will be possible to process the distance to the reflection surface and the orientation of said reflection. In this case, the radar or LIDAR sensor will provide a measurement of a distance and an orientation of the reflection surface.

According to the invention, the antenna arrangement generally comprises an Antenna Control Unit (ACU, 260). The ACU comprises computing logic to differentiate open sky areas from reflection areas by processing the output of the sensors 250. This type of processing is known in the art, as will be documented further down in the description. The ACU further comprises processing logic to generate commands of the driving circuits of the antenna elements 220, the commands being configured so that a radiation pattern of the antenna arrangement matches the open sky/occulted areas, i.e. that high gain is applied to the open sky areas and low gain or a null is applied to the occulted areas.

Thus, in a variant, only the satellites the signals of which are received in LOS and are unaffected by multipath reflections are transmitted to the GNSS receiver through the RF output 240. In another variant, some of the reflected signals may be transmitted to the GNSS receiver (the "clean" reflections), together with a parameter to characterize the reflecting surface.

In another variant, there is also an input port from the GNSS receiver to the processing unit, wherein the input port receives data such as the number of satellites in view. When the number of satellites in view in open sky drops below 4, the processing unit may be configured to relax the conditions defining the open sky and thus drive to antenna elements to generate a wider FOV to acquire the signals of more satellites, so that the number of satellites which are acquired may be increased to or above 4.

In other variants, other data may be transmitted from the GNSS receiver to the processing unit through the input port, notably to adapt the selection of the antenna assembly gain pattern to other factors like, for instance the UERE of a pseudo-range measurement, or a PVT determination.

In all variants of the invention, a compromise based on the application will have to be determined between the improvements to the accuracy of the positioning that data fed to the processing unit will provide and the cost in the additional power that will need to be provided to the processing unit/ACU.

Figure 2A:
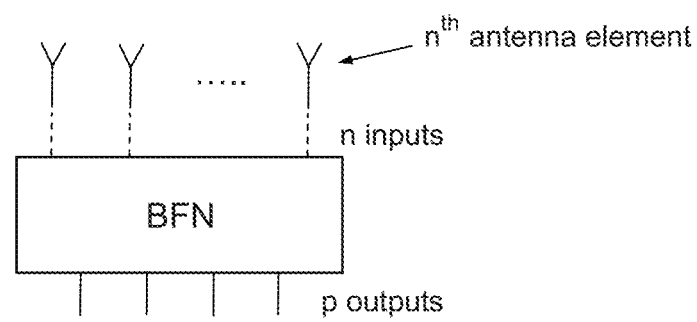
FIGS. 2a and 2b respectively describe a schematic view of an antenna assembly in an embodiment of the invention and a corresponding beam forming pattern.
Figure 2B:
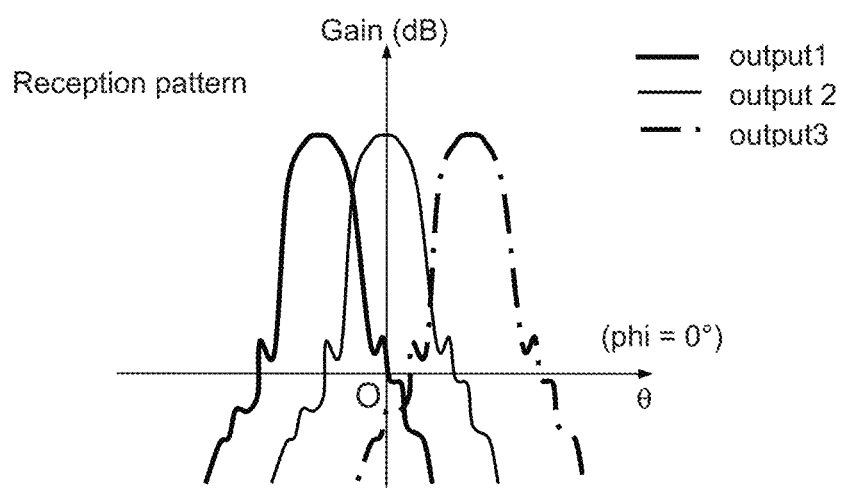

FIGS. 2a and 2b respectively describe a schematic view of an antenna assembly in an embodiment of the invention and a corresponding beam forming pattern.

FIG. 2a is a schematic representation of a Beam Forming Network (BFN). A BFN may be formed, for example, of n Luneburg lenses located in a plane. A typical Luneburg lens's refractive index i decreases radially from the center to the outer surface. Thus, the radiating patterns of the n elements of the BFN can be made independent from one another, so as to make the signals they receive to independently match p areas of the sky above their plane.

FIG. 2b illustrates the beam forming pattern of the BFN, which may therefore correspond to individual areas of the sky, some affected by multipath reflections and others not affected by multipath reflections, which will be processed accordingly.

Figure 3:
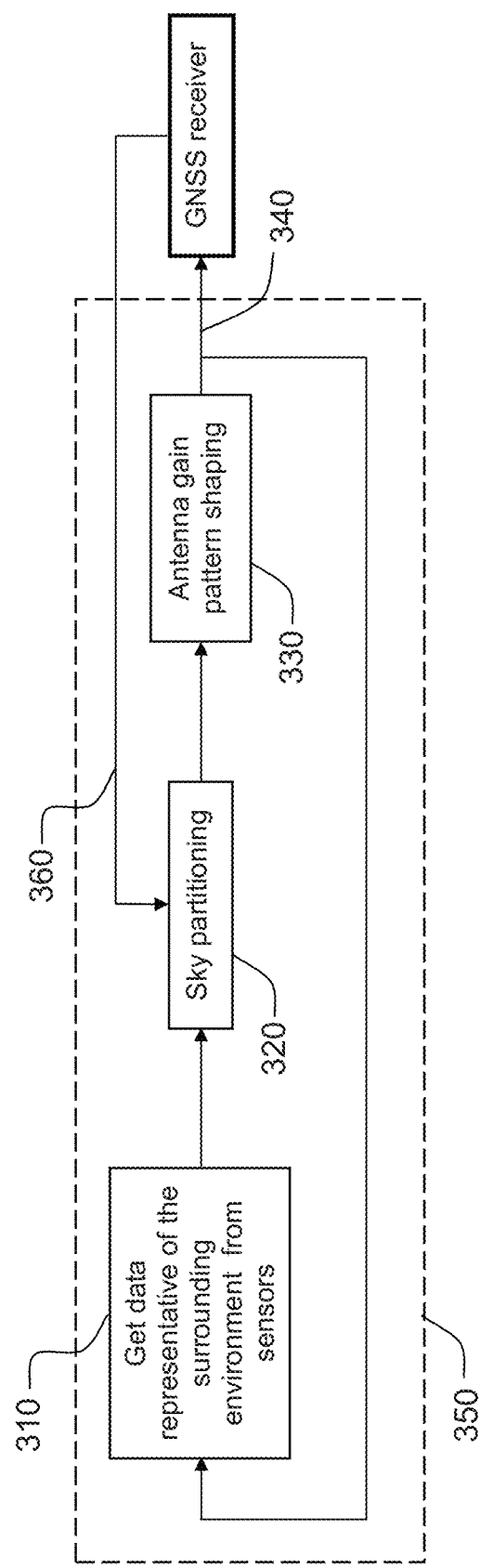
FIG. 3 displays a flow chart to implement the method of the invention according to some of its embodiments.

FIG. 3 displays a flow chart to implement the method of the invention according to some of its embodiments.

At a step 310, data representative of the environment surrounding the antenna arrangement is acquired from the sensors 250. As explained in commenting earlier in the description, this data can be a picture taken by a circular or a full frame fish-eye camera. It can also be a number of different images taken at different azimuth/elevation values by different image sensors. It can also be limited to pixel brightness values. It can also be radar or LIDAR measurements of distances to obstacles at a number of azimuth/elevations. When an obstacle is detected, a coefficient of absorption of RF signals may be associated with the obstacle. Such coefficient may be used to determine non-LOS GNSS signals which may still be processed because they are "clean" multipath reflections. This may be the case if the multipath reflections are specular.

At a step 320, computing logic in the ACU 260 performs a partitioning of the sky in areas which are classified based on the data acquired from the sensors. When the data is an image of the sky, it may be processed using one of the image segmentation algorithms known to a man of ordinary skill. Such algorithms are presented for instance in P. V. Gakne and alii, "Assessing Image Segmentation Algorithms for Sky Identification in GNSS", International Conference on Indoor Positioning and Indoor Navigation, October 2015, Banff, Alberta, Canada. They include notably the Otsu, Mean-Shift, Graph-Cut and Hidden Markov Random Fields Expectation Maximization (HMRF-EM) approaches.

In a variant of the invention, the classification may be binary, i.e. only open sky and non open sky areas are determined. In another variant of the invention, the classification of the sky may comprise more than two classes, e.g. three classes: open sky; clean multipath reflectors; dirty multipath reflectors.

The resolution of the segmentation which serves as a basis for the classification of the sky may be adapted as a function of the spatial resolution of the antenna arrangement. It will also have to be varied as a function of the performance of the receiver to achieve the required power budget of the RF link. The segmentation of the sky will be based on an elementary solid angle which will define an elementary value of a gain of the antenna arrangement.

At step 330, processing logic in the ACU 260 performs an antenna gain pattern shaping. Some examples of how the pattern shaping works are given further below in the description. Pattern shaping may be implemented through commands to be sent to the antenna elements 220 through driving circuits.

The RF signals received at the antenna elements configured by the gain pattern shaping step are combined and sent, 340, to the GNSS receiver.

The process is repeated, 350, at a frequency which may be varied depending on the speed at which the GNSS receiver travels. For instance, a car travelling in an urban environment at 30 km/h covers a bit more than 8 m per second. An update every one or two seconds will probably be enough.

In some embodiments, a return loop from the GNSS receiver allows, 360, a modification of the classification of the sky segments to relax the open sky condition so that a minimum number of satellites may be acquired. This only requires to receive from the receiver at the ACU, 260, an indication of the number of satellites signals received at the receiver after filtering by the antenna pattern shaping. But other data may be deemed useful for applications which require more accuracy, notably professional applications.

Figure 4:
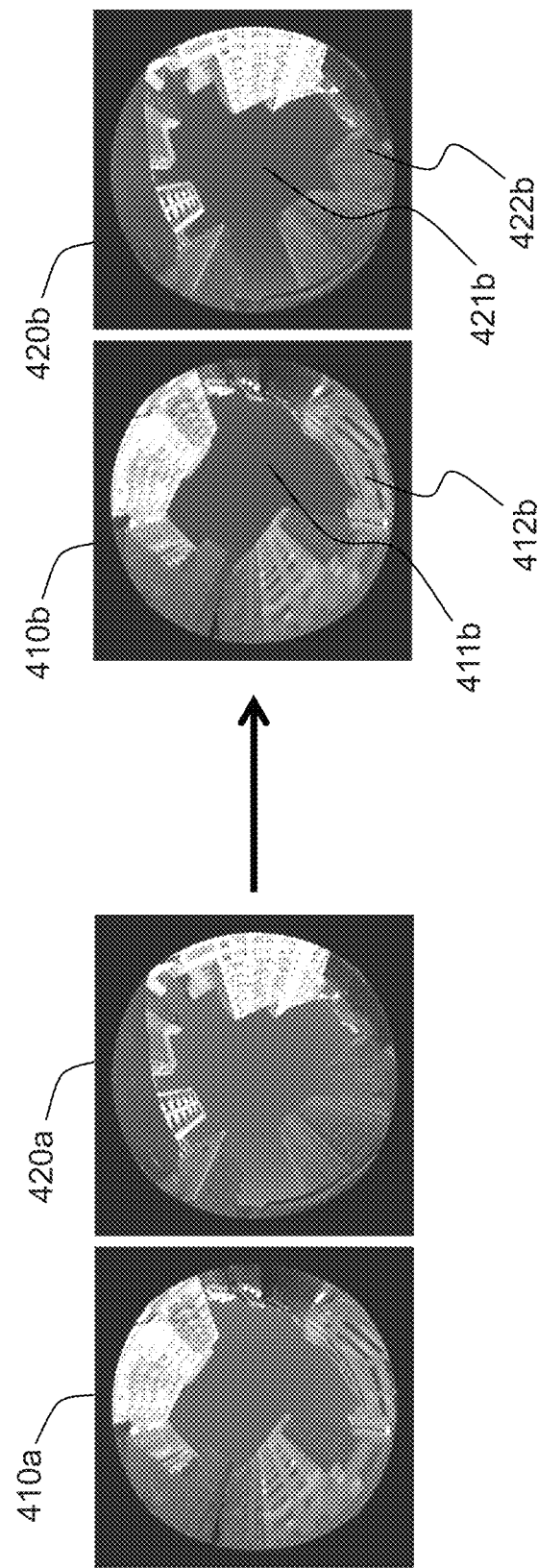
FIGS. 4a and 4b illustrate a process to determine open sky areas according to some embodiments of the invention.

FIGS. 4a and 4b illustrate a process to determine open sky areas according to some embodiments of the invention.

FIG. 4a displays two different circular fish-eye images, 410a, 420a, of the sky with buildings overtopping the receiver.

FIG. 4b is a conversion of the two images in two segmentations, respectively 410b and 420b of the said images. The said segmentations comprise open sky areas 411b and 421b and non open sky areas 412b and 422b.

Based on this simple segmentation, the antenna gain pattern shaping will be generated.

The adequate antenna gain pattern shaping process will be chosen as a function of the application, the resolution of the antenna and the available processing power. Since the resolution of the antenna generally increases with its size, it is unlikely that an application which requires high precision and hence high resolution antenna will be possible with a standalone smart phone. Nevertheless, it is possible to provide an array of antennas positioned, for instance, on the roof of a mall to redistribute the positioning signals indoor. An array of antennas may also be positioned at a streets crossing to redistribute the positioning signals to the navigation systems of the cars or the smart phones of the pedestrians passing by.

Figure 5:
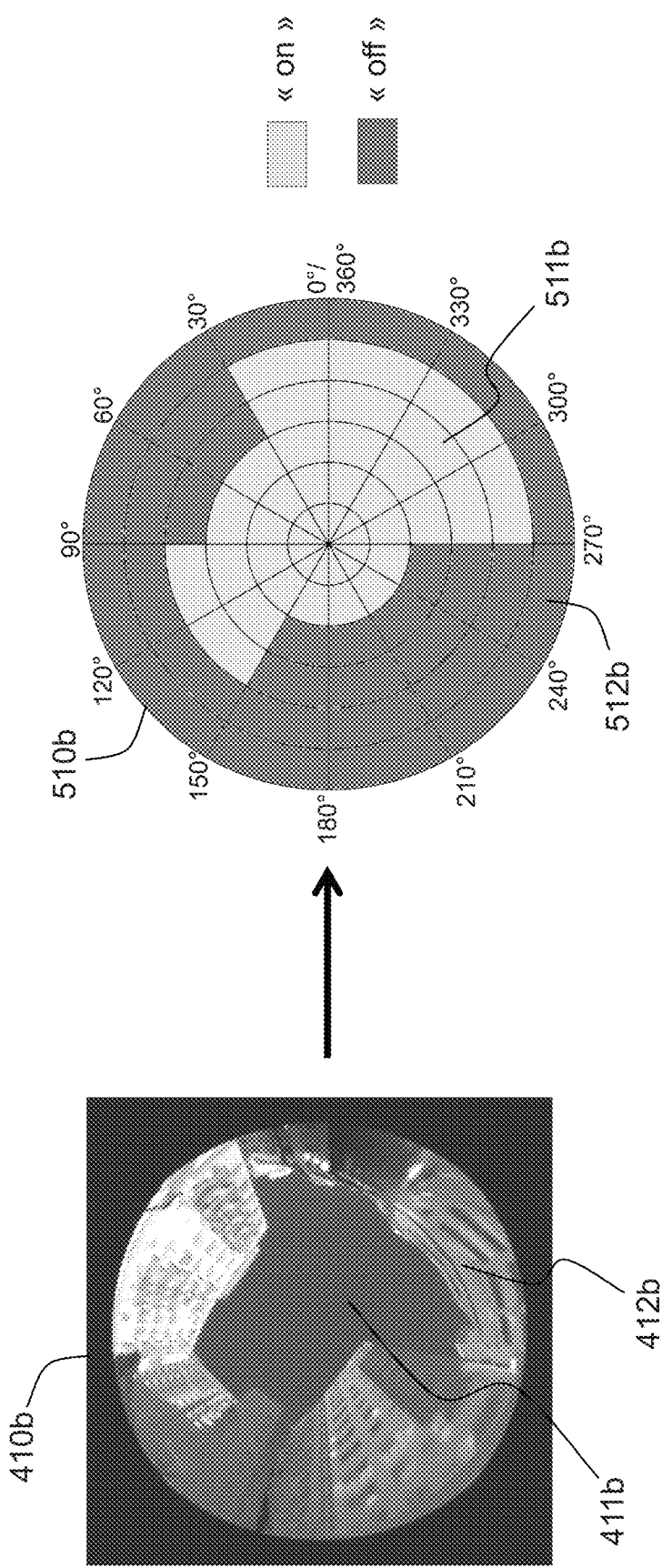
FIGS. 5a and 5b illustrate a process to drive antenna gain pattern shaping to filter beams coming from open sky areas according to some embodiments of the invention.

FIGS. 5a and 5b illustrate a process to drive antenna gain pattern shaping to filter beams coming from open sky areas according to some embodiments of the invention.

FIG. 5a represents the left image of FIG. 4b. An advantageous simple way of shaping the antenna gain to eliminate most of the GNSS signals affected with multipath reflections is to convert the open sky sectors 411b into On state radiating areas 511b and to convert the occulted sky sectors 412b into Off state radiating areas 512b, to form antenna gain pattern 510b. The number of sectors is determined by the resolution of the antenna.

There are then two possible methods to generate the antenna gain pattern of FIG. 5b. A first method is to select the pattern which is the closest to the desired pattern in a tabulated database where the gain patterns of a definite antenna are stored. A second method is to use the phase law of antenna array to calculate by inversion the configuration of the array which will produce nulls at the required locations 512b. The phase law will depend on the antenna configuration and a man of ordinary skill in the art of antenna arrays will know which law applies and how to invert it. Examples of phase laws which may be used to implement the invention are given further below in the description in relation to FIG. 7, their radiating pattern being discussed in relation with FIGS. 8a through 8f. Choosing between the two methods will depend on the computing power and memory available at the ACU. In most cases, the tabulated database will be sufficient. In some cases, different tables may be provided in the database, so that a specific sub-group of gain pattern shaping configurations may be selected in one of the tables in the database to match specific environment conditions determined as a function an area in which the GNSS receiver is located, said area being transmitted from the GNSS receiver to the ACU through the input port.

Figure 6:
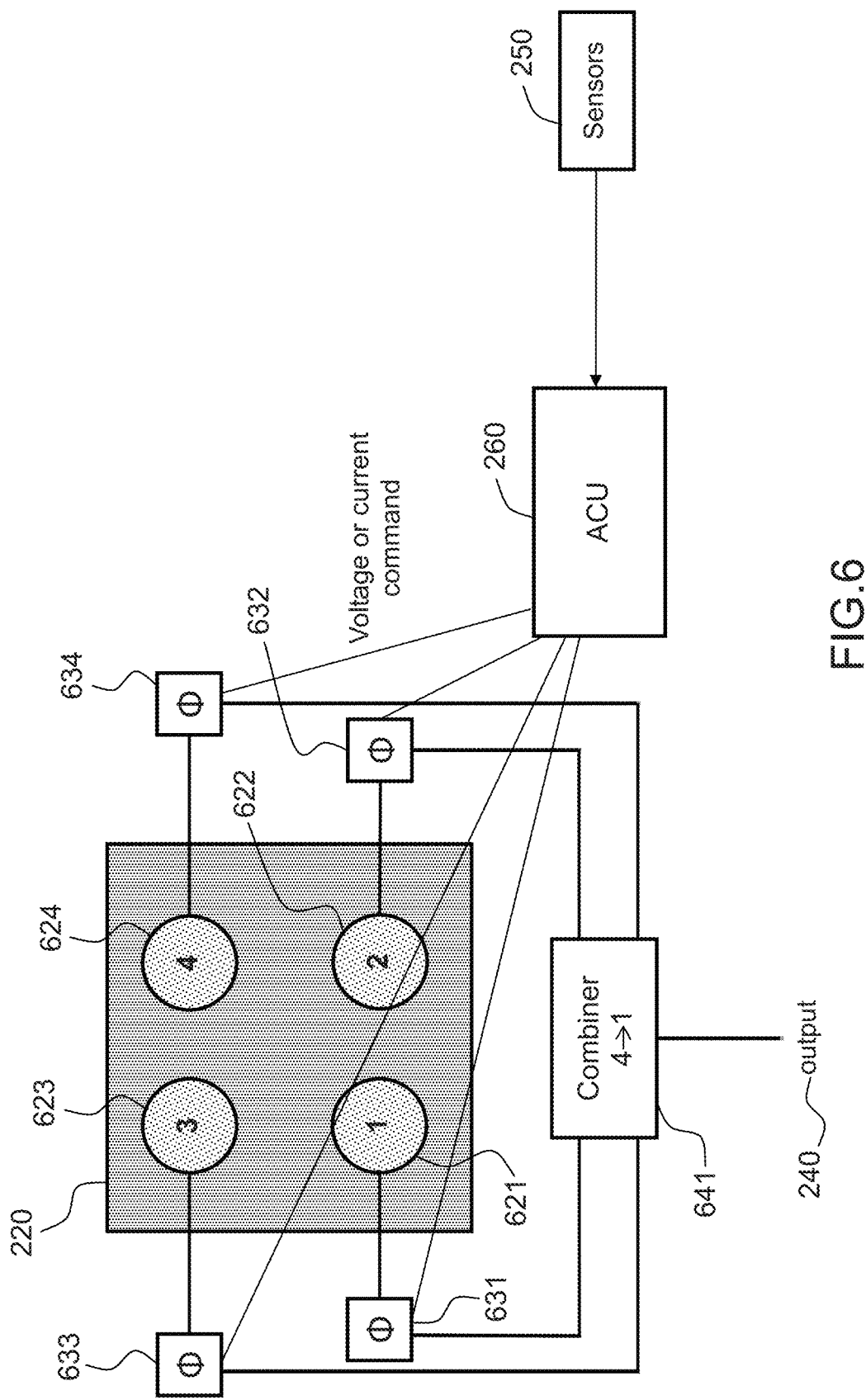
FIG. 6 displays an example of antenna elements with their driving circuits according to some embodiments of the invention.
Figure 8B:
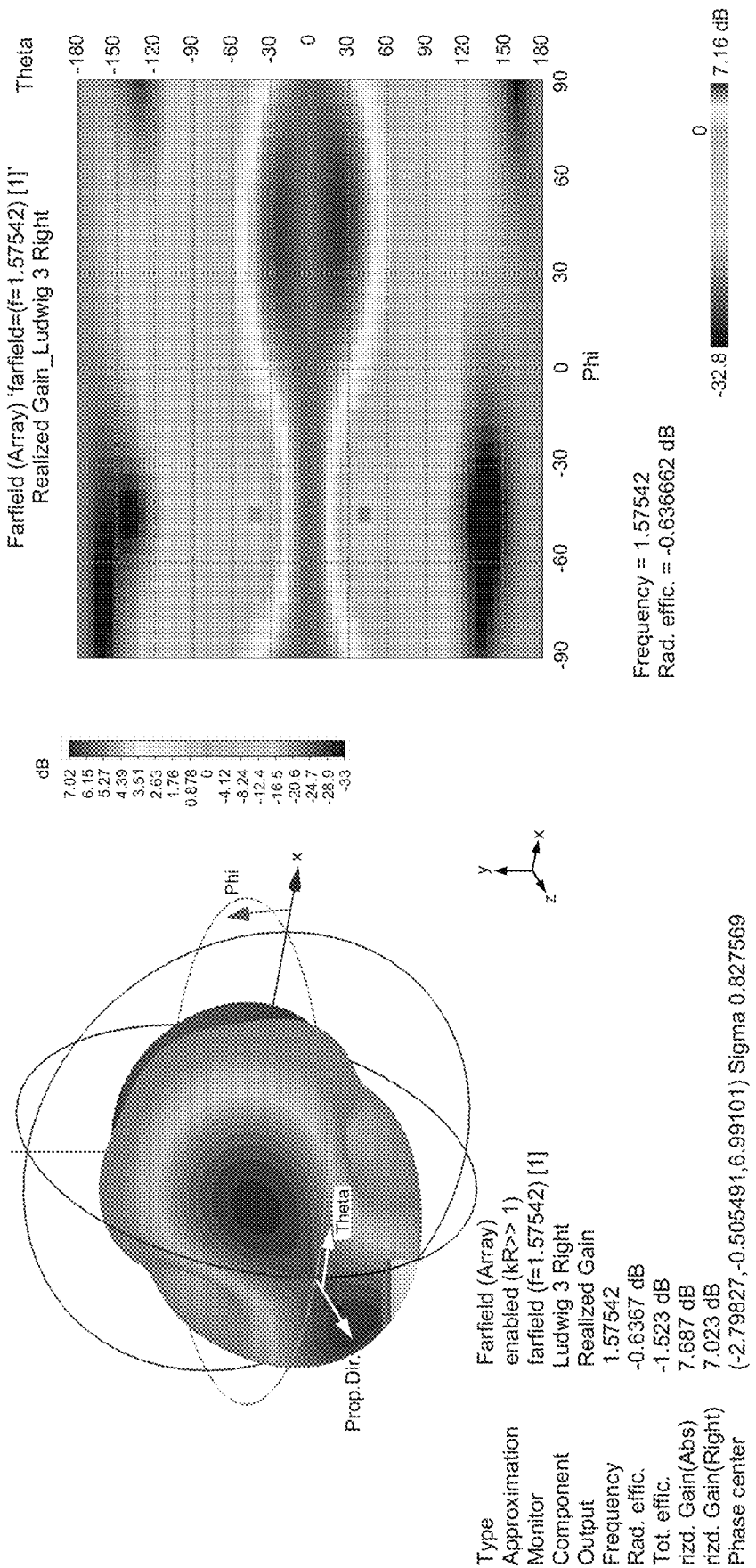
Figure 8C:
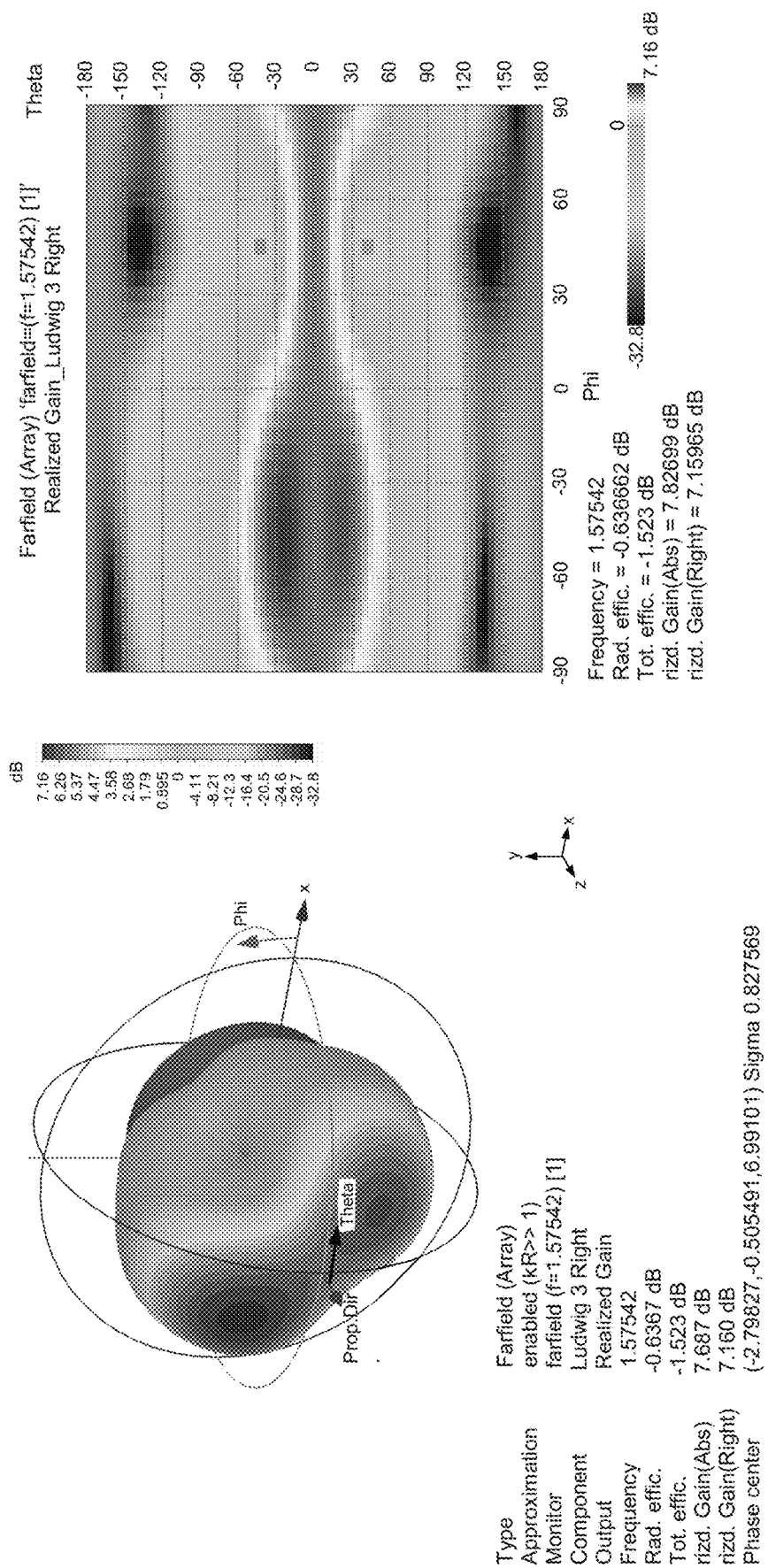
Figure 8E:
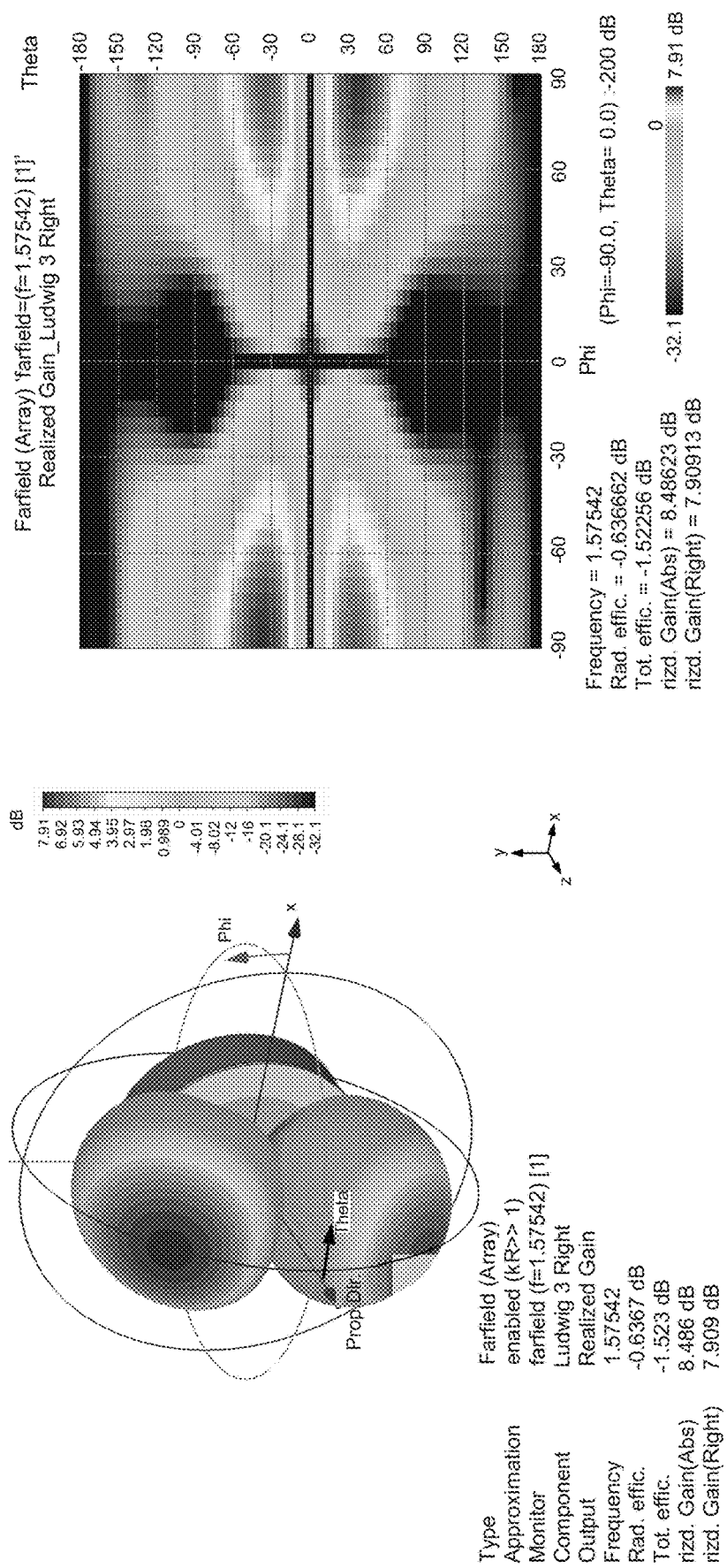

FIG. 6 displays an example of antenna elements with their driving circuits according to some embodiments of the invention.

The antenna arrangement of the figure is an exemplary embodiment of the antenna arrangement of FIG. 2, where the antenna array 220 comprises 4 radiating elements 621, 622, 623, 624.

The four radiating elements may for example be spiral elements. They may also be helix antennas. They may also be patch antennas, possibly in stacked configuration. The patch antennas may be built in a meta-material, possibly an Artificial Magnetic Conductor (AMC).

The radiating elements may be arranged in a square lattice with a 100 mm spacing, which approximately half the wavelength for a GPS L1 frequency of 1,575 GHz. The radiating elements may be protected against mutual coupling by providing a specific ground plane structuring.

The 4 radiating elements are driven by 4 phase shifters 631, 632, 633, 634. The phase shifters may be two-state phase shifters (0°-180°). Phase shifting may be performed by parasitic elements, active lenses or accordable components. The parasitic elements may be Micro Electro Mechanical Systems (MEMS) controlled by an actuator. Generally, the phase shifters receive voltage or current commands from the ACU, 260. The commands are configured to generate the radiation pattern corresponding to the output of the open sky detection algorithm which receives the open sky/occulted sky images/patterns from the sensors 250.

Such a configuration will have a resolution of about $\pi/8$ in elevation and azimuth. If a better resolution is needed, it is possible to increase the number of radiating elements and/or the number of states of the phase shifters. A person of ordinary skill in the art of selecting antenna assemblies and their radiating patterns for given Directions of Arrival of radiations to the antenna assembly will figure out how to design the assembly to find an optimum configuration. Consideration will be notably given to the performances which are needed to discriminate the signals spatially for a given target attenuation of the parasitic signals.

The outputs of the antenna elements are combined in combiner 641 to be sent to the GNSS receiver through output 240.

FIG. 7 displays a table of possible configurations of the antenna assembly of FIG. 6.

The 4 antenna elements 621, 622, 623, 624 having each two possible phase states (0-180° C.), the total number of possible configurations is $4^2$ or 16. But some of these configurations produce the same radiating patterns, because they only differ by a combined $\pi$ shift. In the table, this is the case of:

Configurations 1 and 16, which produce a first same pattern (Pattern I);
Configurations 2, 5, 14 and 15, which produce a second same pattern (Pattern II);
Configurations 3, 4, 12 and 13, which produce a third same pattern (Pattern III);
Configurations 6 and 11, which produce a fourth same pattern (Pattern IV);
Configurations 7 and 10, which produce a fifth same pattern (Pattern V);
Configurations 8 and 9, which produce a sixth same pattern (Pattern VI).

The table stored in a memory of the ACU will then include 6 possible patterns with the corresponding phase shifters commands. For each possible pattern, a map of the null and non null values of the gain of the antenna pattern on a surface, for instance the plane of the antenna arrangement, is also stored. The selection of the pattern for a given map of the open sky will be made based on a best fit between these antenna pattern maps and the on/off state map 510*b* at the output of the open sky detection algorithm. An option is to split the space domain of the sensor in a large number of elements, so that convergence towards the best fit can be obtained.

FIGS. 8*a*, 8*b*, 8*c*, 8*d*, 8*e* and 8*f* represent the radiation patterns of the antenna assembly of FIG. 6 in the different configurations displayed on the table of FIG. 7.

For each of the 6 antenna gain patterns listed above, the figures provide:

The 3D radiating diagram with its gain scale as a function of the Direction of Arrival of the radiations, and a number of parameters (frequency, radiation efficiency, gain . . . );

A 2 D projection of the radiating diagram.

These radiation patterns may be generated by a simulation tool (such as CST™, HFSS™, Feko™ or Comsol™, or other proprietary software) if the parameters of the antenna assembly (geometry, material, phase states, etc.) are input in the tool. As an alternative to the tables, the phase law of the antenna assembly may be input in the ACU for direct computation of the on/off diagram.

In certain embodiments of the invention, it is possible to activate/deactivate a number of antenna elements based on information gathered on the environment of the receiver that are transmitted to the antenna assembly by an optional return path.

FIG. 9 illustrates a feed-back loop to adapt antenna gain pattern shaping in some embodiments of the invention.

In certain cases, the number of satellites in view of the GNSS receiver, after filtering of the ones generating multipath reflections may drop below 4, which will be below what is normally needed to compute a PVT from the satellites pseudo-ranges. If z is not calculated, 3 satellites may be enough, though. To cope with this situation, it is possible to provide a loop to enlarge the "on" zone 511*b* of FIG. 5*b*, as illustrated on FIG. 9. Then some zones 912, 913, 914, 915 may be added to the initial on zone to increase the probability of acquiring and tracking 4 (or 3) satellites. Performing this step supposes that the ACU receives an information representative of the number of satellites from which pseudo-ranges have been processed to compute the PVT. This can be achieved by providing a return path from the GNSS receiver to the ACU. The process may be run iteratively until the number of satellites from which the positioning signals are processed reaches the set minimum of 4 or 3.

In a number of embodiments of the invention, it is possible to keep the signals affected to a certain degree by multipath reflections and apply different weights to the signals which are so affected.

In a number of embodiments of the invention, it is possible to drive the antenna assembly to operate periodically in a standard mode (i.e. with all signals received being transmitted to the GNSS receiver without being filtered by the sensor), so as to calculate a baseline PVT which may be compared from time to time to the PVT calculated from the signals filtered by the sensor.

It is also possible, when the number of satellites acquired in open sky falls below the set threshold, to propagate the PVT calculated before the loss for a maximum duration. This may be implemented with a simple logic added to a standard receiver.

The examples disclosed in this specification are only illustrative of some embodiments of the invention. They do not in any way limit the scope of said invention which is defined by the appended claims.

The invention claimed is:

1. An antenna assembly for receiving GNSS signals, the antenna assembly comprising:
   a plurality of RF antenna elements adapted to receive the GNSS signals;
   driving circuits adapted to drive the plurality of RF antenna elements to generate a defined radiation pattern for receiving the GNSS signals;
   a sensor configured to capture data representative of one or more characteristics of portions of a volume in a field of view of the antenna assembly;
   one or more RF ports to one or more GNSS receivers;
   computing logic configured to output a first projection of the portions of the volume on a first surface and a second projection of the defined radiation pattern on a second surface referenced to the first surface, said first projection being classified into a discrete number of classes based on said data;
   processing logic configured to generate command signals of the driving circuits to shape the defined radiation pattern based on the classified first projection and send the GNSS signals received by the plurality of RF antenna elements with the defined radiation pattern to the one or more GNSS receivers through the one or more RF port.

2. The antenna assembly of claim 1, wherein one of the classes defines a LOS field of view for the antenna assembly and the driving circuits define a maximum gain in the radiation pattern for the class defining a LOS field of view.

3. The antenna assembly of claim 2, further comprising a return path from the one or more GNSS receivers, said return path configured to acquire PVTs calculated by the one or more GNSS receivers.

4. The antenna assembly of claim 3, wherein one or more of the computing logic or the processing logic are controlled by a table of probabilities of finding a minimum of four GNSS satellites in fields of view at defined times and positions and the one or more of the computing logic or the processing logic are configured to extend the class defining the LOS field of view if the probability of finding a minimum of four GNSS satellites in the LOS field of view is lower than the minimum probability in the table at a position of the antenna assembly at the time of measurement.

5. The antenna assembly of claim 1, wherein the driving circuits are phase shifters.

6. The antenna assembly of claim 1, wherein the portions of the volume are solid angles defining a value of a gain of the antenna assembly.

7. The antenna assembly of claim 1, wherein the one or more characteristics of the portions of the volume comprise their transparency to electromagnetic radiations.

8. The antenna assembly of claim 7, wherein the data representative of the transparency of the portions of the volume to electromagnetic radiations comprise a two-state variable defining a LOS/non-LOS to an open sky above the surface.

9. The antenna assembly of claim 8, wherein the sensor comprises one or more of a fish-eye camera, a thermal camera, a radar or a lidar.

10. The antenna assembly of claim 9, wherein the classification is performed by the computing logic processing one or more of images and parameters in an output of a fish-eye camera to discriminate buildings and objects from the open sky.

11. The antenna assembly of claim 9, wherein the classification is performed by the computing logic processing one or more parameters in an output of a thermal camera to discriminate heat radiating objects.

12. The antenna assembly of claim 9, wherein the classification is performed by the computing logic processing one or more parameters in an output of a radar or a lidar to discriminate echo-returning objects in the field of view.

13. The antenna assembly of claim 1, wherein one or more of the computing logic or the processing logic access a table of gain pattern shaping factors stored in a memory of the antenna assembly, said gain pattern shaping factors to be applied to each class of the first projection, the gain pattern shaping factors being used to drive the driving circuits.

14. The antenna assembly of claim 13, wherein one or more of the computing logic or the processing logic are controlled by a minimum solid angle and extend the class defining the LOS field of view if the field of view of the class is lower than the minimum solid angle.

15. A positioning system comprising one or more GNSS receivers, said one or more GNSS receivers acquiring GNSS signals through an RF port receiving the GNSS signals from an antenna assembly, said antenna assembly comprising:
  a plurality of RF antenna elements adapted to receive the GNSS signals;
  driving circuits adapted to drive the plurality of RF antenna elements to generate a defined radiation pattern for receiving the GNSS signals;
  a sensor configured to capture data representative of one or more characteristics of portions of a volume in a field of view of the antenna assembly;
  one or more RF ports connected to one or more GNSS receivers;
  computing logic configured to output a first projection of the portions of the volume on a first surface and a second projection of the defined radiation pattern on a second surface referenced to the first surface, said first projection being classified into a discrete number of classes based on said data;
  processing logic configured to generate command signals of the driving circuits to shape the defined radiation pattern of the antenna assembly based on the classified first projection and send the GNSS signals received by the plurality of RF antenna elements with the defined radiation pattern to the one or more GNSS receivers through the one or more RF port.

16. A method of shaping a radiation pattern of an antenna assembly for GNSS signals, the method comprising:
  receiving GNSS signals via the antenna assembly, said antenna assembly comprising a plurality of RF antenna elements;
  driving the plurality of RF antenna elements to generate a defined radiation pattern for receiving the GNSS signals;
  capturing data representative of one or more characteristics of portions of a volume in a field of view above the antenna assembly;
  outputting from an RF output the GNSS signals to one or more GNSS receivers;
  outputting a first projection of the portions of the volume on a first surface and a second projection of the defined radiation pattern on a second surface referenced to the first surface, said first projection being classified into a discrete number of classes based on said data;
  generating command signals of the driving circuits to shape the defined radiation pattern of the antenna assembly based on the classified first projection and sending the GNSS signals received by the plurality of RF antenna elements with the defined radiation pattern to the one or more GNSS receivers through the RF output.

* * * * *